United States Patent [19]
Swanson

[11] 3,932,746
[45] Jan. 13, 1976

[54] TIMING SYSTEM HAVING INFARED START-STOP GATES

[76] Inventor: Robert E. Swanson, 4725 Highline Place, Denver, Colo. 80216

[22] Filed: Apr. 5, 1974

[21] Appl. No.: 458,117

[52] U.S. Cl. ................ 250/221; 250/338; 250/341; 324/175
[51] Int. Cl.² .......................................... G01D 21/04
[58] Field of Search ........... 250/221, 338, 341, 342; 324/175

[56] References Cited

UNITED STATES PATENTS

| | | | |
|---|---|---|---|
| 2,729,288 | 1/1956 | Malott | 250/221 X |
| 2,955,209 | 10/1960 | Eckweiler, Jr. et al. | 250/221 |
| 3,619,629 | 11/1971 | Matthews | 250/221 |
| 3,735,260 | 8/1971 | Hartline et al. | 324/175 |

*Primary Examiner*—Archie R. Borchelt

[57] ABSTRACT

This highly portable, self-contained timing system includes photoelectronic start-stop gates which employ a pulsed invisible light beam as a means for communicating a condition of elapsed time and for aligning each gate.

18 Claims, 8 Drawing Figures

TIMING SYSTEM HAVING INFARED START-STOP GATES

BACKGROUND AND SUMMARY OF THE INVENTION

This invention relates to photoelectric timing systems, and particularly to such systems employing pulsed invisible light beams for communicating a condition of time.

Timing systems for measuring elapsed times having light-beam activated start-stop gates are well known in the art. The design of these well known systems has proved disadvantageous for many applications and in certain situations these systems if usable are extremely inconvenient to use. For example, prior art timing systems using incandescent lamps for generating the light beam, normally require an external electrical power source to be connected to each start-stop gate, because incandescent lamps of sufficient intensity to provide an adequate light beam require large amounts of power. It is a great inconvenience to extend electrical power cables over the long distances which may separate the start and stop gates, particularly when the terrain is rugged or inaccessible, such as with a ski slope. For example, it may prove entirely impractical to supply electrical power when the gates are separated by stretches of water. Batteries of sufficient power to supply the incandescent lamps are bulky, heavy and difficult to transport and the use of such batteries as a power source is also inconvenient.

In prior art systems having incandescent light beams, the beam may not be of sufficient intensity to accurately communicate elapsed time in a variety of different atmospheric, weather or ambient conditions. An incandescent beam cannot penetrate fog or rain without diffusing. High intensity floodlights or bright sunshine may override the incandescent lamp beam preventing accurate registration of light-beam interruption. If timing must occur in total darkness, an incandescent system is not suitable since its light beam is visible and produces illumination. In addition, the incandescent beam generally lacks sufficient intensity to accurately penetrate the long distances necessary to form a wide start or finish line essential in some vehicle racing contests, for example. Another disadvantage of previous systems is that the incandescent lamps may easily burn out, resulting in an unnecessarily high probability of system malfunction. Accordingly, it is an object of this invention to provide an improved timing system which overcomes the foregoing disadvantages of the prior art.

It is another object of this invention to provide a timing system having start-stop gates which are portable, self-contained, internally energized and simple to handle, set-up and operate.

It is a further object of this invention to provide a timing system having start-stop gates employing a light beam of a quality and intensity which yields highly accurate timing even over long distances and in a variety of atmospheric, weather and ambient conditions.

It is still another object of this invention to provide a timing system which requires little attention, service or maintenance.

Briefly, in carrying out the objects of this invention in one embodiment thereof, each start-stop gate of the present invention employs a source of invisible light and at least one receiver for the invisible light. A light beam is formed by directly light from the light source to the light receiver, and when an object crosses and interrupts the light beam, the light receiver senses the interruption and communicates a signal to a counter-timer which indicates a condition of elapsed time. The light source includes solid state circuitry for providing a pulsating or modulated beam of high intensity, semi-coherent, invisible light. The light receiver, also of solid state circuitry, is a device adjusted for optimum reception of the light beam. The light receiver filters out all light signals other than the pulsating or modulating light beam and converts the light beam signal to a voltage. Interruption of the light beam has the effect at the light receiver of altering the pulsating frequency of the beam, and the light receiver rejects the altered frequency causing the voltage level to drop. A logic circuit monitoring the voltage level yields a digital signal when the voltage level drops which is communicated over a single conductor or over a radio communication link to the counter-timer for indicating a condition of elapsed time. The system includes means for facilitating the alignment of the light beam from the light source to the light receiver. Such means may provide an audible sensory signal of high volume when optimum alignment is attained, and it may also include a light emitting device for providing a visual sensory indication that the light source and light receiver are out of alignment.

The features of novelty which characterize this invention are pointed out with particularity in the claims annexed to and forming a part of this specification. The invention itself, however, both as to its organization and manner of operation, together with further objects and advantages thereof, will be best understood upon reference to the following description taken in conjunction with the accompanying drawings, in which:

DETAILED DESCRIPTION OF THE INVENTION

Figure 1:
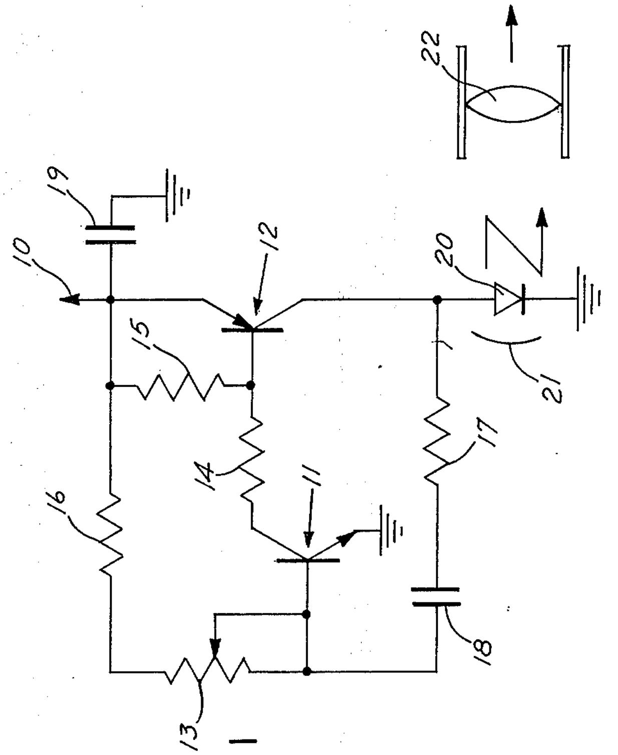
FIG. 1 is a schematic circuit diagram of a light beam source comprising a portion of the present invention.

Referring now to FIG. 1, there is illustrated a solid state light source or means for generating a beam of light which may be connected to a source 10 of direct voltage, such as a small, inexpensive three volt battery. A conventional relaxation oscillator circuit is formed by transistors 11 and 12; variable resistors 13; fixed resistors 14, 15, 16 and 17; and capacitor 18. Capacitor 19 stabilizes the voltage of source 10. The oscillator circuit is connected to provide high peak current pulses or modulated current to a light emitting device 20 which preferably may be an infrared light emitting diode or infrared semiconductor laser diode. Optical equipment, such as a reflector 21 and lens 22, may be used to direct the light from device 20 in a beam across a predetermined path. Variable resistance 13 adjusts the operating frequency of the relaxation oscillator to match a selected response frequency of a light receiver which will be explained in detail subsequently. Additional frequency adjustment may be provided by changing the values of resistor 16 and capacitor 18. Resistor 17 sets the duty cycle of the oscillator. In operation, current pulses delivered to device 20 cause the infrared light emitting diode or infrared semiconductor laser diode to emit pulses of semicoherent infrared light near 9000 angstroms in wavelength. As a result of the pulsed operation, the light intensity of device 20 is up to five times its nominal level. The increased light output and the semi-coherent nature of the light provide a light beam of high intensity and quality which is able to penetrate a variety of weather, atmospheric and ambient conditions in addition to being sufficient to communicate long distances and provide very accurate timing.

Figure 2:
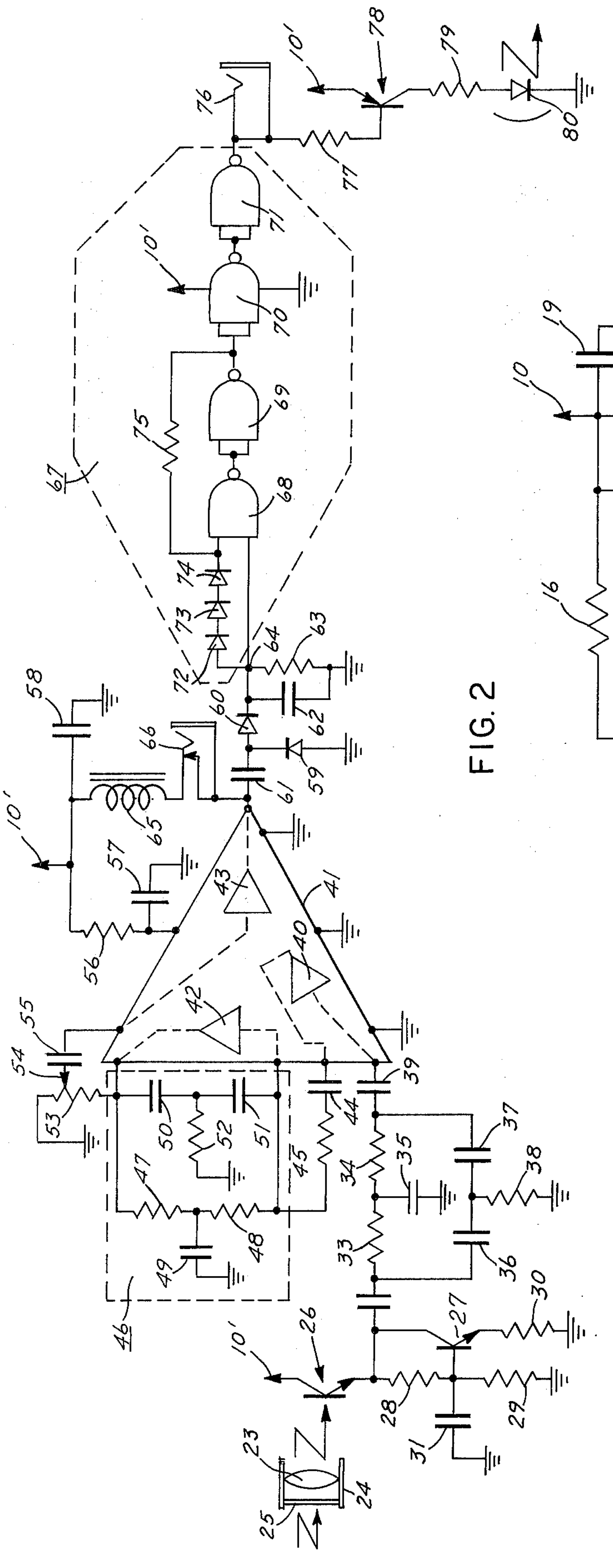
FIG. 2 is a schematic circuit diagram of a light beam receiver comprising a portion of the present invention.

Referring now to FIG. 2 one embodiment of a light receiver or light beam receiving means is located in an optimum position in the path of the light beam originating from the light source. Optical equipment, for example a lens 23, a light shielded tube 24, and an infrared filter 25, is used to direct the light beam from its predetermined path causing it to impinge on a light responsive amplifying device 26. Device 26 is preferably a phototransistor, photodiode, or photo-field effect transistor, any of which have a peak sensitivity response for light of wavelength near 9000 angstroms. The peak sensitivity response of device 26 matches the wavelength of the light emitted from the light source thereby providing for sensitive and accurate system performance.

Device 26 and the remainder of the light receiver circuitry in FIG. 2 are connected to a direct voltage source 10′, which may be, for example, a small, inexpensive nine volt battery. Device 26 is connected to a preamplifier and automatic dynamic load circuit comprising transistor 27, resistors 28 and 29 connected for biasing transistor 27, resistor 30 connected as a load for transistor 27, and a bias voltage stabilizing capacitor 31. Ambient light could cause device 26 to saturate and thereby render it uneffected by the light beam were it not for the automatic dynamic load circuit which keeps the device 26 out of saturation. As the current through device 26 increases as a result of ambient light, resistors 28 and 29 bias transistor 27 more conductive to divert the ambient-light-induced current from device 26 to resistor 30, thus eliminating any possibility of saturation. Stabilizing capacitor 31 renders transistor 27 uneffected by current pulses produced by device 26. Summarizing, the automatic dynamic load circuit negates the effect of ambient light while having no effect on any pulsating electrical signal caused by the corresponding pulsating light beam impinging on device 26.

The light receiver circuitry described thus far is connected by a coupling capacitor 32 to a 120 Hz signal filter such as a well known parallel "T" filter illustrated. One branch of the parallel "T" filter comprises resistors 33 and 34 connected in series and capacitor 35 connected between the junction of the resistors 33 and 34 and reference potential. The other "T" of the filteer includes capacitors 36 and 37 connected in series and resistor 38 connected between the junction of capacitors 36 and 37 and reference potential. The values of resistors 33, 34 and 38 and capacitors 35, 36 and 37 are determined by well known methods so as to eliminate any 120 Hz frequencies from the electrical signal conducted through the filter. Arranged in this manner the effect on the light receiver of 120 Hz light pulses produced by a conventional 60 Hz electrical supply is eliminated. The values of the components of the parallel "T" filter may be changed to produce a frequency filter for light pulses originating from power supplies of any frequency.

A coupling capacitor 39 is arranged to transmit signals from the 120 Hz filter to the input of a first amplifying stage 40 contained within an integrated circuit 41. The integrated circuit 41 also contains second and third amplifying stages 42 and 43, respectively. The integrated circuit 41 is an ultra high gain, low noise, wide band device having small current drain and being capable of maintaining performance over wide temperature ranges and changes in supply voltage.

The first amplifying stage 40, used as a pulse amplifier, amplifies the pulsating signal conducted through the 120 Hz filter and supplies the amplified pulsating signal to a capacitor 44 and a resistor 45 connected in series. Capacitor 44 and resistor 45 as well as the first amplifying stage 40 also serve to provide impedance matching for maintaining maximum signal strength.

The output from the first amplifying stage 40, after being conducted through capacitor 44 and resistor 45, is applied to the input of the second amplifying stage 42. Seecond amplifying stage 42 operates as a selected frequency signal amplifier as a result of a filtering feedback network 46 connected between its input and output. The filtering feedback network 46 may be arranged in a parallel "T" configuration illustrated having one "T" formed by resistors 47 and 48 connected in series and capacitor 49 connected between the junction of resistors 47 and 48 and reference potential. The other "T" is formed by capacitors 50 and 51 connected in series and resistor 52 connected between the junction of capacitors 50 and 51 and reference potential.

The choice of values of the resistors and capacitors of the filtering feedback network 46 allows the second amplifying stage 42 to pass only a selected response frequency at which it is desired that the light source pulse or modulate the light beam. By changing the values of the components of the filtering feedback network, the frequency of light beam pulses to which the light receiver responds may be changed. As previously described the pulsing frequency of the light source may readily be adjusted so as to match the selected response frequency of the light receiver.

The selected response frequency may be predetermined by considering factors such as the size of the object which interrupts the light beam and the estimated maximum speed at which the object passes through the light beam. However, for the majority of applications, including sporting events, a selected response frequency in the audio frequency range is sufficient and preferred for accurate timing.

The output signal of the second amplifying stage 42 is applied to resistor 53, and a portion of this signal is conducted by an adjustable wiper arm 54 to a coupling capacitor 55 connected in series with the input of the third amplifying stage 43. The wiper arm 54 is a gain or sensitivity control, and the third amplifying stage 43 provides final amplification of the signal of the selected response frequency.

Power for the integrated circuit 41 is supplied from source 10′ through a series connected resistor 56. Resistor 56 and capacitor 57, connected between the junction of resistor 56 and integrated circuit 41 and reference potential, stabilizes the source voltage.

The amplified signal of the selected response frequency passes to a voltage doubling circuit also serving as a pulse signal detector circuit. The voltage doubling circuit is arranged in the conventional manner and comprises diodes 59 and 60, capacitors 61 and 62, and resistor 63. The output of the third amplifying stage 43 is rectified by the voltage doubling circuit in a manner which doubles the alternating voltage and stores the voltage at capacitor 62. The presence of a voltage at junction 64 indicates the light receiver is responding to the selected frequency of pulsation of the light beam. Whenever the light receiver is not responding to the selected frequency of light beam pulsation, the voltage at junction 64 dissipates due to the current draining resistor 63 connected in parallel with capacitor 62. Thus the voltage doubling circuit acts as a pulse detector circuit by providing a voltage at junction 64 indicating that the light receiver is responding to the selected response frequency of light beam pulsation.

Means for facilitating optimum alignment of the light receiver and the light source is also connected to the output of the third amplifying stage 43. Such means may include an inductor 65 and a closed-circuit jack 66 connected serially between the source 10' and the output of the third amplifying stage 43. Inductor 65 is a high impedance load for the third amplifying stage 43. An audible signal for facilitating alignment may be provided when headphones (not shown) are plugged into jack 66. As previously discussed, a light beam pulsating in the audio frequency range is sufficient for a majority of timing system applications, and this selected response frequency signal in the audio frequency range causes a tone in the headphones. Under conditions of optimum alignment, the loudest audio tone will be present. Since the strength of the tone indicates the accuracy of alignment, physical placement of the light source and the light receiver may be altered to secure the strongest tone. Likewise the headphones may be employed to adjust the pulse frequency of the light source to match the selected response frequency of the light receiver since the audio tone will only be present when matching is attained.

A voltage level digital detector 67 monitors the voltage level at junction 64. The voltage level digital detector 67 comprises four two-input NAND gates 68, 69, 70 and 71 of the complimentary symmetry, metal oxide semiconductor type. The NAND gates are of positive logic and logically connected in series with both inputs of NAND gates 69, 70 and 71 wired respectively to the outputs of NAND gates 68, 69 and 70. One input of NAND gate 68 directly conducts the voltage level at junction 64, and the other input is conditioned by serially connected diodes 72, 73 and 74. The sum of the threshold conduction voltages of diodes 72, 73 and 74 results in an off-set or voltage difference between the two inputs of NAND gate 68. The off-set or voltage difference may be controlled by varying the number of serially connected diodes in the diode-conditioned input of NAND gate 68. Resistor 75 is connected to provide feedback of the same logic level between the output of NAND gate 69 and the diode-conditioned input of NAND gate 68. All the circuitry of the voltage level digital detector 67 may be formed as a single integrated circuit.

In operation the logic state of each NAND gate of the voltage level digital detector is opposite that of its immediate logically-preceeding NAND gate as a result of the method in which the NAND gates are connected.

Thus the logic states of the inputs of NAND gate 68 control the output of the voltage level digital detector 67. When voltage at junction 64 is present and of high level, indicating optimum alignment and no beam interruption, the cumulative threshold voltage of diodes 72, 73 and 74 is overcome and two similar logic states are present at the inputs of NAND gate 68, resulting in logical 0 outputs from NAND gates 68 and 70 and logical 1 outputs from NAND gates 69 and 71. Upon interruption of the light beam, the effect as sensed by the light receiver is an alteration of the pulse frequency from the light source. The light receiver rejects the altered frequency and the voltage at junction 64 drops rapidly. The decreased voltage at junction 64 is no longer sufficient to overcome the cumulative threshold voltage of diodes 72, 73 and 74, and the diode-conditioned input of NAND gate 68 is then of logic state 0 and the direct-conducting input is of logic state 1. At this instant the output logic states of all the NAND gates change, resulting in a 0 logic state output from NAND gate 71. Thus it can be seen that an interruption of the light beam results in an output logic state of 0 from the voltage level digital detector 67, and jack 76 is provided for monitoring this output.

The means for facilitating alignment may include a visual signal and may also serve to indicate light beam interruption. The previous explanation illustrating the change of logic output states from the voltage level digital detector 67 upon interruption of the light beam is equally applicable when the light source and the light receiver are out of alignment, because the out-of-alignment condition results in no light beam being received by the light receiver, in no selected response frequency signal being conducted through the light receiver, in no voltage present at junction 64, and in the output logic state of the voltage level digital detector being a 0 with a voltage level near reference potential. In this condition biasing resistor 77, connecting the output of NAND gate 71 and the base of PNP transistor 78, causes transistor 78 to be conductive thereby directing current from source 10' through resistor 79 to a light emitting diode 80. When the output logic state of the voltage level digital detector 67 is 1, indicating proper alignment and no beam interruption, transistor 78 is biased nonconductive and the light emitting diode 80 is inoperative.

Figure 3:
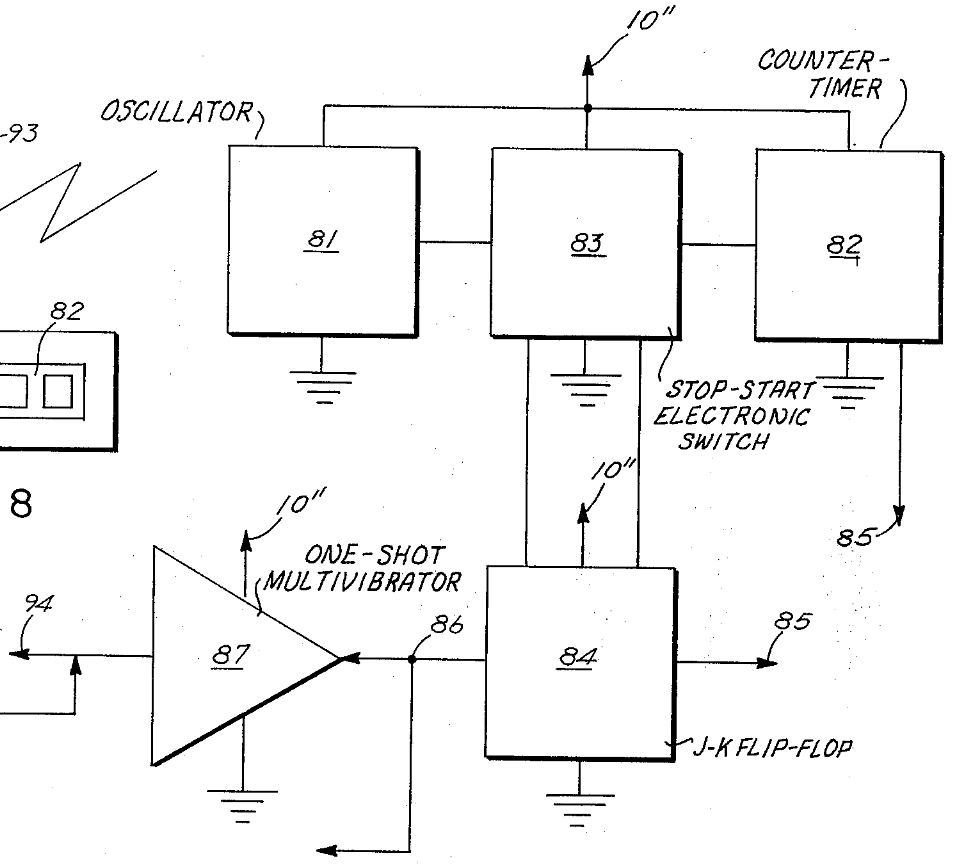
FIG. 3 is a block diagram of various components used in conjunction with the light source and light receiver to form one embodiment of a timing system comprising the present invention.

Referring now to FIG. 3, a timing means is illustrated in block diagram form. The components are all low current drain, semiconductor types which may be suitably powered by a small, inexpensive low-voltage battery shown as source 10''. The timing means includes a reference oscillator 81 for providing clock pulses to be registered on a counter-timer 82 which may also include a numerical display. A start and stop electronic switch 83 controls the counter-timer 82 by conducting clock pulses from the reference oscillator 81 at the instant of the beginning of the timed event and terminating the clock pulses at the instant of interruption of the light beam at the termination of the timed event. On and off controls for switch 82 are respectively provided by two outputs from a J K flip flop 84. A reset 85 is provided to clear and condition counter-timer 82 and J K flip flop 84. Both output states of the J K flip flop 84 change each time a digital change of state occurs at its input 86. A one shot multivibrator 87 receiving its input as jack 88 may be employed to drive the J K flip flop 84.

A change of logic state occurs at jack 76 upon interruption of the light beam, as previously explained. In one embodiment of the timing system a shielded coaxial cable is connected between jack 76 of FIG. 2 and jack 88 of FIG. 3. The shielded coaxial cable communicates changes of logic state from the voltage level digital detector 67 to the one shot multivibrator 87 which accentuates the changes of logic state and triggers the J K flip flop 84. The outputs of the J K flip flop 84 effect the switch 83 resulting in a change of condition in the counter-timer 82, either turning it on or off to initiate or terminate a timing period.

The voltage level digital detector 67 of FIG. 2 may optionally be contained within an enclosure housing the electronic components illustrated in FIG. 3. Under such circumstances the one shot multi-vibrator 87 is unnecessary. The voltage output from junction 64 is conducted through a shielded coaxial cable to the input of the voltage level digital detector, and the output of NAND gate 71 directly drives the input 86 of the J K flip flop 84. Arranged in this manner the shielded coaxial cable communicates the voltage level from the light receiver circuitry located at the position of the light beam to the voltage level digital detector and circuitry for actuating the light emitting diode 80 contained within the timing means.

Figure 4:
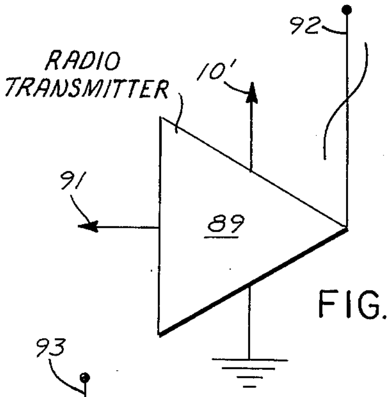
FIG. 4 is a radio transmitter which may optionally be used as a part of the present invention.
Figure 5:
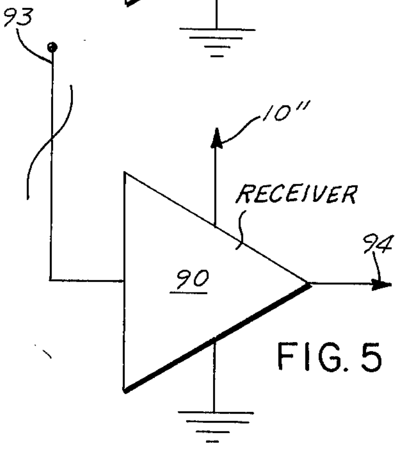
FIG. 5 is a radio receiver which is used in conjunction with the radio transmitter of FIG. 4.

A further optional embodiment of the present invention eliminates the necessity for any shielded interconnecting cable whatsoever. In this embodiment the cable is replaced by a radio transmitter 89 shown in FIG. 4 and a radio receiver 90 shown in FIG. 5 to provide a radio communication link between the light receiver and the timing means. The radio transmitter 89 of FIG. 4 is contained within the light receiver unit of FIG. 2 and powered by the source 10'. Input 91 to radio transmitter 89 is derived from the output of the voltage level digital detector 67. Radio transmitter 89 is arranged to be activated only when the output logic state of the voltage level digital detector 67 goes to 0, indicating light beam interruption. Operating in this manner, there is little current drain from source 10', allowing the small, low-voltage battery to provide adequate electrical power for the radio transmitter and the light receiver. The radio signal indicating light beam interruption is communicated from antenna 92 of radio transmitter 89 to antenna 93 of radio receiver 90 in FIG. 5. Radio receiver 90 operates only when activated by the radio signal and thus causes little current drain from source 10''. The output 94 from radio receiver 90 is applied to the one shot multivibrator 87 of FIG. 3, resulting in operation of the timing system as previously described.

Figure 8:
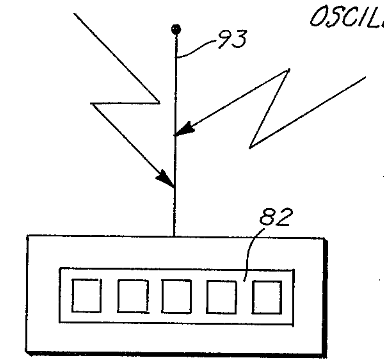
FIGS. 6, 7 and 8 are illustrations of components of the timing system embodying the present invention which used in an advantageous form.
Figure 6:
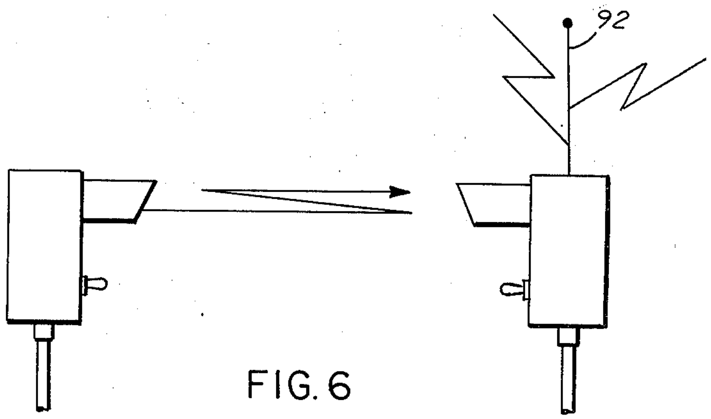
Figure 7:
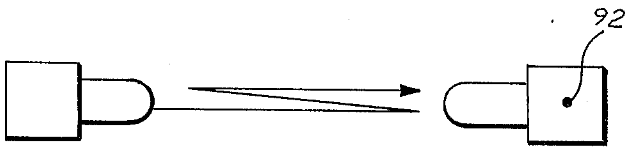

Referring now to FIGS. 6, 7 and 8 the present invention is illustrated in a very advantageous form. As shown in a side view in FIG. 6 and in a top view in FIG. 7, the self-contained light source emits a light beam which impinges on the self-contained light receiver, with the path of the light beam defining a point at which a timing condition is to be measured. Upon interruption of the light beam the radio transmitter sends a signal from antenna 92 to the antenna 93 of the radio receiver forming a part of the timing means. The condition of the timed event is thus measured at the counter-timer 82.

Light sources and light receivers of the present invention may be used in a variety of applications. Although shown in FIGS. 6 and 7 as separated by the path in which the object travels when interrupting the beam, the light source and light receiver may be located on the same side of the path. In this situation a mirror or deflector on the opposite side of the path is used to communicate the beam from the light source to the light receiver. With such an arrangement the light source and light receiver may be located within the same enclosure and powered by the same electrical source. It is also possible that a multi-faced reflector could be used to communicate the light beam from a single light source to a plurality of light receivers, each of the light receivers being positioned to measure a different condition of time by effecting its own separate timing means.

From the foregoing, many advantages of the present invention are apparent. Each element of the invention employs solid state circuitry and is designed to be self-contained so that small batteries may be used as electrical power sources. the solid-state components are extremely reliable and also provide very high quality and intensity of invisible light for accurate timing in a variety of atmospheric weather and ambient conditions. The present invention eliminates the necessity of any interconnecting cables, or if desired, eliminates all cables except one. Furthermore, the components of the present system are highly portable and easy to handle and operate.

Although the invention has been described in connection with specific circuits and circuit components, various modifications and other applications will occur to those skilled in the art. Therefore it is not desired that the invention be limited to the details illustrated and described and it is intended by the accompanying claims to cover all modifications which fall within the spirit and scope of the invention.

I claim:

1. A readily portable timing system for sporting events and the like comprising:
- means for generating pulsed invisible light,
- means for directing light from said generating means in a beam across a predetermined path,
- light beam receiving means,
- said receiving means including means for utilizing the impingement thereon of light from said generating means for producing a sensory signal to facilitate optimum alignment of said receiving means with said beam along said path,
- means associated with said receiving means for detecting an interruption of said beam,
- timing means having a start and stop control, and
- means dependent upon interruption of said beam for actuating said start and stop control to change the condition of operation of said timing means.

2. A readily portable timing system for sporting events and the like comprising:
- means for generating a beam of infrared light,
- means for pulsing said beam at a predetermined frequency,
- light beam receiving means,
- means for providing a light beam communication path between said generating means and said light beam receiving means,
- said receiving means including means for utilizing the predetermined frequency of pulsation of said beam for producing a sensory signal to facilitate optimum alignment of said generating means and said receiving means in the light beam communication path,
- means associated with said light beam receiving means for detecting interruption of said beam, timing means having a start and stop control, and means responsive to interruption of said beam for activating said start and stop control to change the condition of operation of said timing means.

3. The timing system as recited in claim 2 wherein said means for utilizing the predetermined frequency of pulsation produces an audio frequency sensory signal.

4. The timing system as recited in claim 2 wherein said means for utilizing the predetermined frequency of pulsation produces a visible sensory signal.

5. The timing system as recited in claim 2 wherein said means for actuating said start and stop control includes a radio communication link.

6. A readily portable timing means for sporting events and the like comprising:

means for generating a beam of light and for directing it across a predetermined path, means for pulsing said beam at an audio frequency, light beam receiving means for positioning in the path of said beam, means associated with said receiving means for detecting an interruption of said beam, said receiving means including means for utilizing the audio frequency pulses of said beam for facilitating alignment of said receiving means with said beam along said path, timing means having an "on" and "off" control, and means responsive to interruption of said beam for actuating said "on" and "off" control to change the condition of operation of said timing means.

7. The timing system as recited in claim 6 wherein said means for generating a beam of light generates invisible light.

8. The timing system as recited in claim 6 wherein:

said means for generating a beam of light and a source of electrical power for operating said generating means are contained within a single enclosure, and said light beam receiving means and a source of electrical power for operating said receiving means are contained within a single enclosure.

9. The timing system as recited in claim 6 wherein said means for facilitating alignment includes means for producing a tone whose strength increases until optimum alignment is attained.

10. The timing system as recited in claim 6 wherein said means for facilitating alignment includes means for producing a visual signal of an out-of-alignment condition.

11. A readily portable timing system for sporting events and the like comprising:

means for generating invisible light, means for directing light from said generating means in a beam across a predetermined path, light beam receiving means, said receiving means including means for utilizing the impingement thereon of light from said generating means for producing a sensory signal to facilitate optimum alignment of said receiving means with said beam along said path, means associated with said receiving means for detecting an interruption of said beam, timing means having a start and stop control, and means dependent upon interruption of said beam for actuating said start and stop control to change the condition of operation of said timing means, said light beam receiving means including means for negating the effect of ambient light upon said light beam receiving means.

12. The timing system as recited in claim 11 wherein said negating means includes a transistor biased by ambient-light-induced current.

13. The timing system as recited in claim 2 wherein said light beam receiving means includes means for eliminating the effect of light pulsed at frequencies other than said predetermined frequency.

14. The timing system as recited in claim 13 wherein said means for eliminating the effect of light pulsed at frequencies other than said predetermined frequency includes a frequency filter.

15. The timing system as recited in claim 14 wherein the frequency filter suppresses 120 Hertz signals.

16. The timing system as recited in claim 13 wherein said light beam receiving means further includes means for negating the effect of ambient light upon said light beam receiving means.

17. The readily portable timing system as recited in claim 2 wherein said light generating means, said light receiving means and said start and stop control comprise low current drain semi-conductor elements and including a battery as the source of power.

18. The readily portable timing system as recited in claim 16 wherein said light generating means, said light receiving means and said start and stop control comprise low current drain semi-conductor elements and including a battery as the source of power.

* * * * *